United States Patent [19]

Anderson

[11] 4,420,296
[45] Dec. 13, 1983

[54] CLOSURE ASSEMBLY

[75] Inventor: Michael P. Anderson, Park Orchards, Australia

[73] Assignee: Kovan Engineering Pty. Ltd., Australia

[21] Appl. No.: 386,918

[22] Filed: Jun. 10, 1982

[30] Foreign Application Priority Data

Feb. 19, 1982 [AU] Australia .............................. PF2772

[51] Int. Cl.³ ........................ A01J 25/13; A01J 25/15; B29C 1/00; E06B 5/00
[52] U.S. Cl. ...................................... 425/444; 49/280; 99/452; 99/460; 99/461; 100/250; 425/85; 425/308
[58] Field of Search ................... 49/279, 280; 425/442, 425/444, 296, 308, 86, 84, 85; 99/496, 456, 460, 461, 458, 477, 452

[56] References Cited

U.S. PATENT DOCUMENTS

| | | | |
|---|---|---|---|
| 770,586 | 9/1904 | Jaeger | 425/442 |
| 2,508,877 | 5/1950 | Walker et al. | 100/250 |
| 3,208,114 | 9/1965 | Deakins et al. | 425/444 |
| 3,694,128 | 9/1972 | Foxen | 425/442 |
| 4,137,836 | 2/1979 | Megard | 99/456 |
| 4,152,101 | 5/1979 | Charles | 99/456 |

*Primary Examiner*—Willard E. Hoag
*Attorney, Agent, or Firm*—Steele, Gould & Fried

[57] ABSTRACT

A closure assembly especially adapted for use with the mould of cheese block forming machines, includes structure defining an opening and a closure member mounted to the structure for movement to and from a position in which it closes the opening. Co-operable locking means on the structure and closure member include a first element fixedly mounted to a shaft for rotation with the shaft, which is in turn rotatably supported on the closure member, and a second element defining a seat for the first element in a particular rotational position of the shaft. Seated engagement between the elements at this position physically locks the closure member in its closed position. Drive means coupled between the structure and the shaft is reversibly actuable to execute a first motion in which it drives the closure member from an open condition to its closed condition and then a succeeding second motion in which it causes rotation of said shaft to effect seated engagement of the co-operating locking means.

18 Claims, 5 Drawing Figures

CLOSURE ASSEMBLY

This invention relates to a closure assembly which has particular application as a side door for pressure moulds such as those required in certain kinds of cheese block forming machines. In a particular application, the invention relates to a cheese block forming machine incorporating the closure assembly.

In a known cheese block forming machine, successive commercial blocks of cheddar cheese are guillotined from the lower end of an upright column of fused milled curd. The curd column rests on a guillotine blade, which is periodically withdrawn to allow the column to be lowered on a platform to an extent such that the guillotine may be returned to sever a cheese block of substantially standard weight. The platform is then raised again to pressurize the block before a side closure opens to permit the block to be expelled by a ram onto an adjacent conveyor.

The side closure for this machine is required to open in such a manner as to leave an unimpeded path for the expelled cheese block. It should also be designed when closed to withstand internal pressure as the block is compressed. In one commercial cheese block forming machine, a first pair of rams rotate an associated pair of closure support arms which are shaped and mounted so that the closure moves both outwardly of the housing defining the cheese mould and laterally to clear a path for the expelled block. A second pair of hydraulic rams mounted on the aforesaid arms are used to lock the closure under applied pressure so that it may withstand internal pressure as the cheese is compressed. In practice, this arrangement is quite expensive and somewhat cumbersome, requiring complex universal joints to mount the closure. Moreover, there are occasions when the cheese pressure overcomes the locking rams and the closure moves ajar.

It is an object of this invention to provide an improved closure assembly, suitable for cheese block forming machines of the kind described, but which has wide application in circumstances where the performance requirements are similar.

The invention accordingly provides, in one aspect, a closure assembly comprising:
  structure defining an opening;
  a closure member mounted to said structure for movement to and from a position in which it closes said opening;
  cooperable locking means on said structure and closure member including a first element fixedly mounted to a shaft for rotation with the shaft, which is in turn rotatably supported on said closure member, and a second element defining a seat for said first element in a particular rotational position of the shaft, seated engagement between the elements at this position physically locking the closure member in its closed position; and
  drive means coupled between the structure and said shaft, reversibly actuable to execute a first motion in which it drives said closure member from an open condition to said closed condition and then a succeeding second motion in which it causes rotation of said shaft to effect seated engagement between said elements of the cooperable locking means.

Preferably, said shaft extends transversely across the outer face of the closure member and carries said first element at each of its ends. There are then respective said second elements projecting from the structure to either side of the opening. A single fluid-operable piston and cylinder unit, e.g. a hydraulic ram device, may serve as said drive means, its cylinder being fixed to the structure and its piston rotatably pinned to a member, for example a clevis, which is fixed to and projects laterally of said shaft.

Advantageously, the closure member is hingedly mounted to the structure so that it wholly clears said opening in its open position. Further advantageously, the closure member provides, in its fully open position, a transfer bed across which an object may be slid from the opening.

In a further aspect, the invention affords the aforesaid closure assembly in a cheese block forming machine including structure which defines a cheese block mould and a block expulsion opening therefrom. Such structure may include a vertically moveable platform providing a floor for said mould adjacent the foot of a tower for enclosing an upright column of curd, the machine further comprising a transversely reciprocable guillotine for severing successive blocks of cheese from the column.

Typically, this machine structure further includes a moveable panel and associated drive means for ejecting the block through said opening.

The invention will be further described, by way of example only, with reference to the accompanying drawings, in which.

Figure 1:
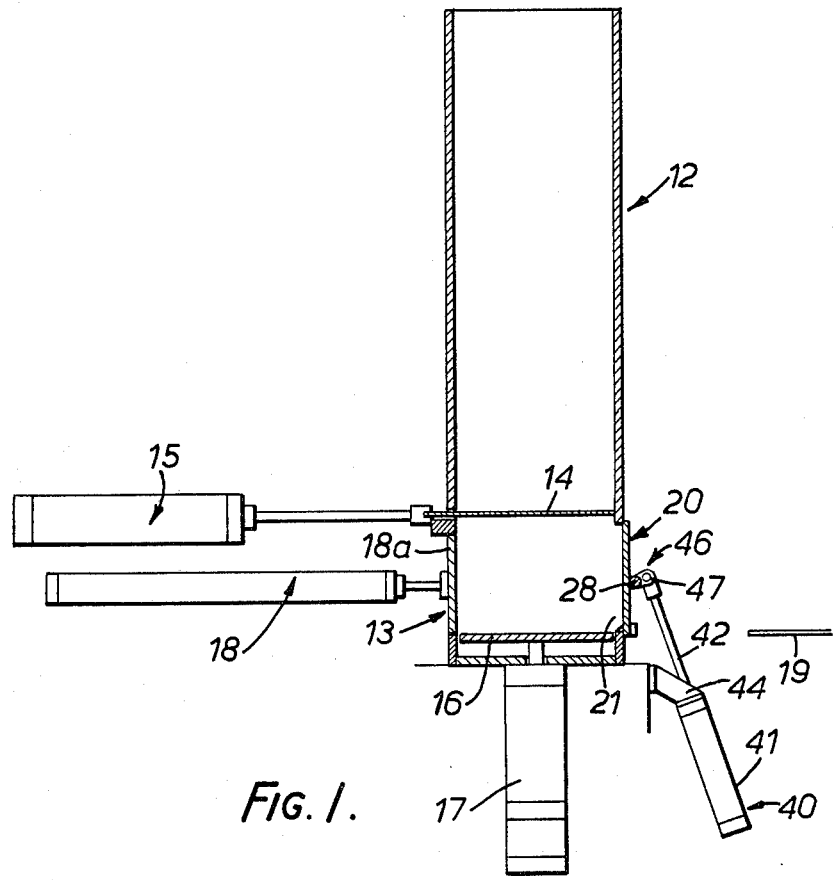
FIG. 1 is a sectioned diagram showing the material parts of a cheese block forming machine fitted with a closure assembly in accordance with the invention.
Figure 2:
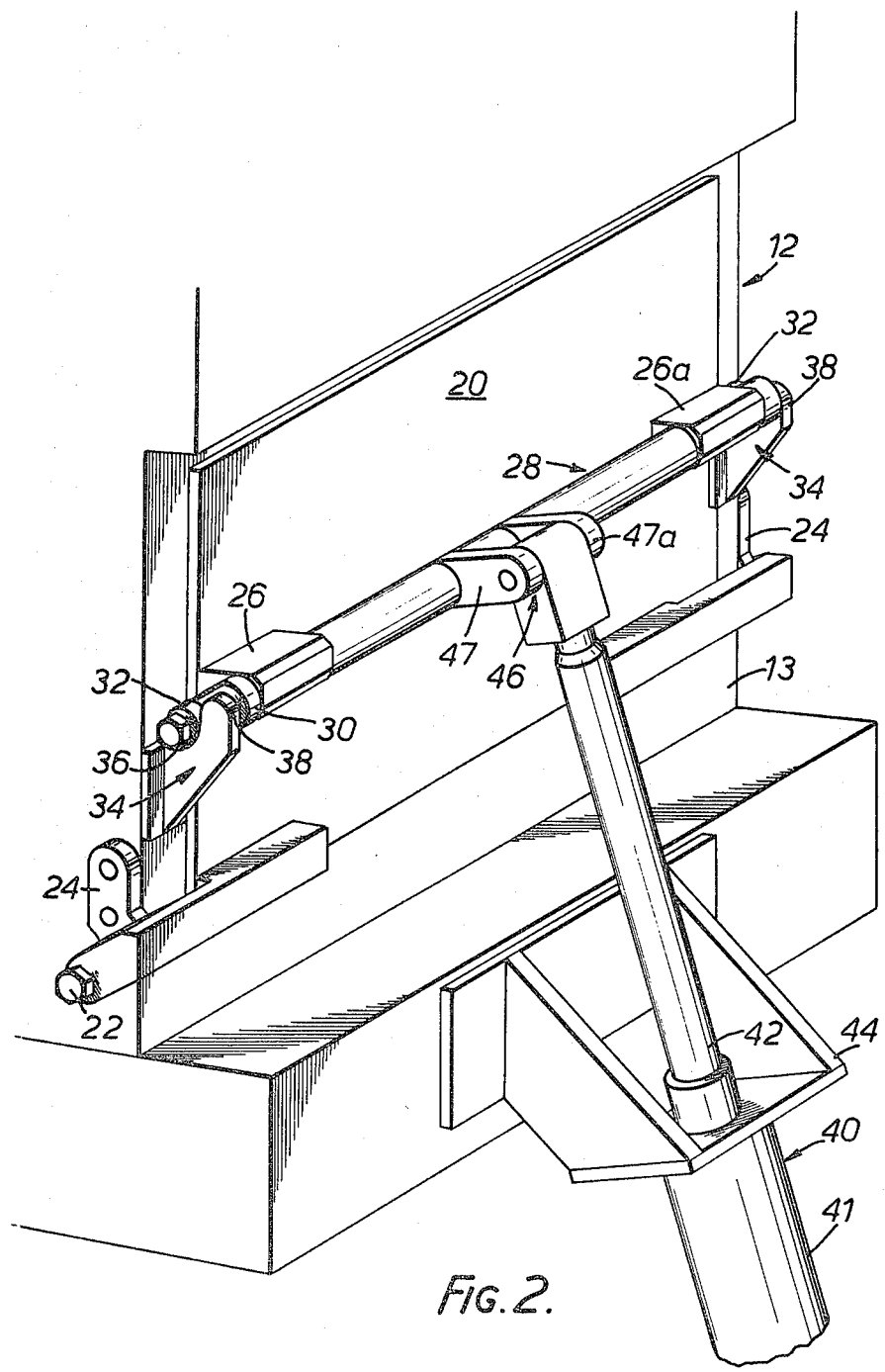
FIG. 2 is a perspective view of the principal components of the closure assembly in its closed condition.

The illustrated cheese block forming machine includes a tower 12 for enclosing an upright column of fused milled curd. The lower end of the tower defines a cheese block mould 13 extending between a transversely (i.e. horizontally) reciprocable guillotine blade 14 and a vertically moveable platform 16 which lies adjacent to and closes off the foot of the tower. Guillotine 14 is periodically withdrawn by a hydraulic ram 15 to allow the column of curd to be lowered on platform 16 to an extent such that guillotine 14 may be returned by ram 15 to sever a cheese block of substantially standard weight. Platform 16 is then raised slightly to pressurize the block, after which a side closure 20 for a lateral opening 21 defined by the tower structure is moved to its open position. A hydraulic ram 18 acting on a moveable panel 18a of mould 13 pushes the cheese block through opening 21 onto a conveyor 19. Here the block is wrapped and taken away for storage. A control mechanism for platform 16 is indicated in FIG. 1 by box 17.

Side closure 20 forms part of a closure assembly in accordance with the invention. Closure 20 is a rectangular steel plate hingedly mounted, by pins 22 to projecting lugs 24, adjacent a bottom corner edge of tower structure 12 for pivotal movement about a horizontal axis which is spaced downwardly and outwardly from the bottom rim of opening 21. This permits the closure 20 to overlap the sides of opening when in its closed condition and to have its upper or inside surface in register with the bottom rim of the opening when in its open condition, so as to act as a transfer support bed for the expelled block.

A pair of knuckles 26, 26a are secured to the outer face of closure 20 and rotatably receive a shaft which extends, either integrally or in coupled segments, the full width of the closure. The ends of shaft 28 fixedly mount respective radially projecting lugs 30 which in turn support respective rollers 32 beside the adjacent edges of closure 20.

Rollers 32 are cooperable with respective cam plates 34 which project outwardly and upwardly from tower structure 12 adjacent the margin of opening 21 to define, at their upper edges, both an inward seat 36 for the associated roller 32 and a higher curved cam surface 38 as a lead-in for the seat. The arrangement is such that if the closure is lifted to its closed position with the rollers raised, the rollers must first traverse cam surfaces 36, typically by rolling along the cam surfaces, and may then be dropped into their seats by rotation of shaft 28. This provides an excellent physical lock for the closure.

The closure is driven by means of hydraulic ram unit 40. The cylinder 41 of ram unit 40 fixedly depends, from a supporting cradle 44 secured to tower structure 12, outwardly at an angle of about 20° to the vertical. Ram or piston 42 of unit 40 is hingedly pinned at its upper end to a clevis 46 formed by a pair of rearwardly projecting lugs 47, 47a fixedly secured to the centre region of shaft 28.

Figure 3:
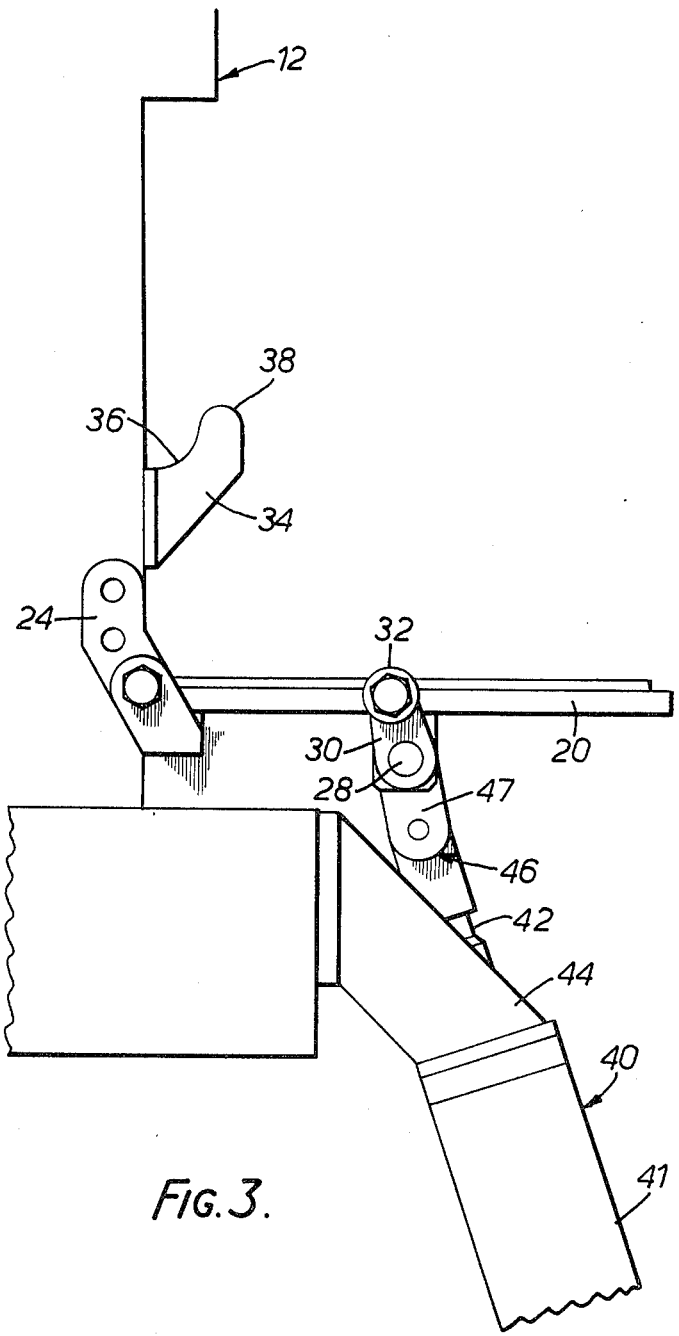
FIGS. 3, 4 and 5 are schematic side elevational views of the closure member in various positions.
Figure 4:
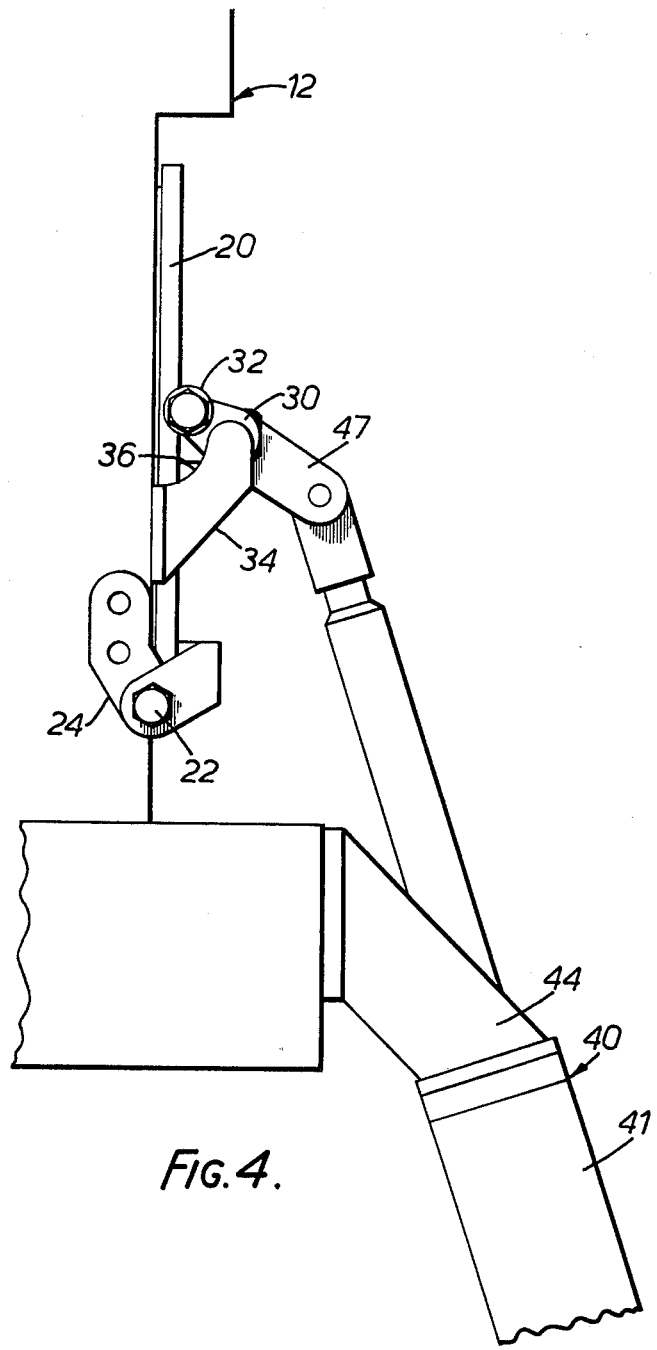
Figure 5:
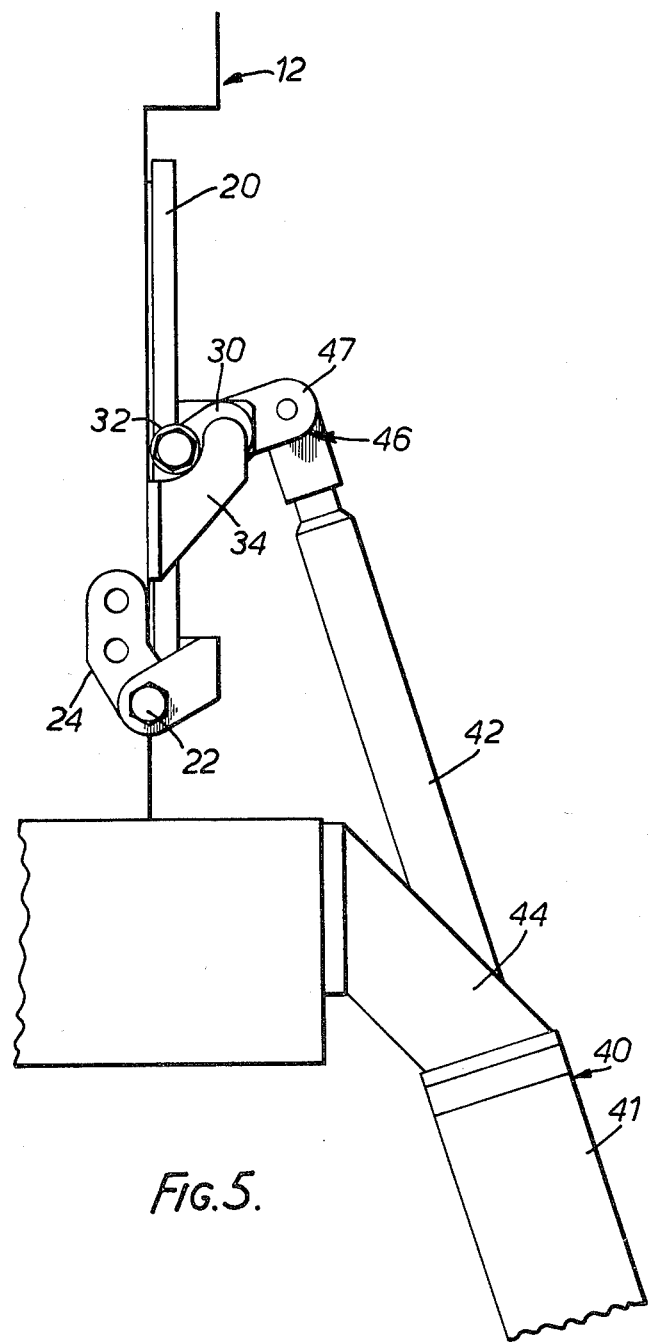

The open position of closure 20 is shown in FIG. 3, highlighting the transfer support role of the closure in this position. To close opening 21, ram unit 40 is actuated to pivot closure 20 on pins 22 to the near closed but unlocked condition depicted in FIG. 4. The angular relationship of shaft 28 and ram 42 is such that rollers 32 roll over cam plates 34. Contact of closure 20 with the rim of opening 21 (FIG. 4) completes a first motion of ram unit 40. A succeeding, second, motion of the ram unit is then effective to lock the closure as ram 42 continues a short distance upwardly to rotate shaft 28 and drop rollers 32 into seats 36 of cam plates 34 (FIG. 5).

It will be appreciated that the illustrated and described closure assembly is an effective and simple means of meeting the requirements of reliable operation, clearance for cheese block expulsion and locking of the closure against internal mould pressure. Only one hydraulic ram unit is required and the coupling between the closure and the ram is relatively uncomplicated. The combination of the physical lock effected by engagement of rollers 32 in seats 36 and sustained hydraulic ram pressure on shaft 28 is effective in ensuring that the closure does not come ajar during the pressure stroke of platform 16.

What is claimed is:

1. A closure assembly comprising:
   structure defining an opening;
   a closure member mounted to said structure for movement to and from a position in which it closes said opening;
   co-operable locking means on said structure and closure member including a first element fixedly mounted to a shaft for rotation with the shaft, which is in turn rotatably supported on said closure member, and a second element defining a seat for said first element in a particular rotational position of the shaft, seated engagement between the elements at this position physically locking the closure member in its closed position; and
   drive means coupled between the structure and said shaft, reversibly actuable to execute a first motion in which it drives said closure member from an open condition to said closed condition and then a succeeding second motion in which it causes rotation of said shaft to effect seated engagement between said elements of the co-operable locking means.

2. A closure assembly according to claim 1 wherein said shaft extends transversely across the outer face of the closure member and carries a said first element at each of its ends, respective said second elements projecting from the structure to either side of the opening.

3. A closure assembly according to claim 1 or 2 said drive means comprises a single fluid-operable piston and cylinder unit arranged with its cylinder fixed to the structure and its piston rotatably pinned to a member which is fixed to and projects laterally of said shaft.

4. A closure assembly according to claim 3 wherein said member to which the piston is pinned comprises a clevis.

5. A closure assembly according to claim 1 or 2 wherein the or each first element comprises a lug which projects laterally from the shaft, and a roller rotatably carried by the lug.

6. A closure assembly according to claim 5 wherein the or each second element comprises a plate which projects outwardly and upwardly from adjacent the margin of said opening, to define a seat for the associated roller and a higher cam surface which the roller must traverse as the closure member approaches its closed condition, said seated engagement between the elements of the co-operable locking means comprising engagement of the roller in said seat.

7. A closure assembly according to claim 1 or 2, wherein the closure member is hingedly mounted to the structure so that it wholly clears said opening in its open position.

8. A closure assembly according to claim 7 wherein the closure member provides, in its fully open position, a transfer bed across which an object may be slid from said opening.

9. In a cheese block forming machine including structure which defines a cheese block mould and a block expulsion opening therefrom, a closure assembly comprising:
   a closure member mounted to said structure for movement to and from a position in which it closes said opening;
   co-operable locking means on said structure and closure member including a first element fixedly mounted to a shaft for rotation with the shaft, which is in turn rotatably supported on said closure member, and a second element defining a seat for said first element in a particular rotational position of the shaft, seated engagement between the elements at this position physically locking the closure member in its closed position; and
   drive means coupled between the structure and said shaft, reversibly actuable to execute a first motion in which it drives said closure member from an open condition to said closed condition and then a succeeding second motion in which it causes rotation of said shaft to effect seated engagement of said co-operable locking means.

10. A cheese block forming machine according to claim 9 wherein said shaft extends transversely across the outer face of the closure member and carries a said first element at each of its ends, respective said second elements projecting from the structure to either side of the opening.

11. A cheese block forming machine according to claim 9 or 10 wherein said drive means comprises a single fluid-operable piston and cylinder unit arranged with its cylinder fixed to the structure and its piston rotatably pinned to a member which is fixed to and projects laterally of said shaft.

12. A cheese block forming machine according to claim 11 wherein said member to which the piston is pinned comprises a clevis.

13. A cheese block forming machine according to claim 9 or 10 wherein the or each first element comprises a lug which projects laterally from the shaft, and a roller rotatably carried by the lug.

14. A cheese block forming machine according to claim 13 where the or each second element comprises a plate which projects outwardly and upwardly from adjacent the margin of said opening, to define a seat for the associated roller and a higher cam surface which the roller must traverse as the closure member approaches its closed condition, said seated engagement between the elements of the co-operable locking means comprising engagement of the roller in said seat.

15. A cheese block forming machine according to claim 9 or 10 wherein the closure member is hingedly mounted to the structure so that it wholly clears said opening in its open position.

16. A cheese block forming machine according to claim 15 wherein the closure member provides, in its fully open position, a transfer bed across which an object may be slid from said opening.

17. A cheese block forming machine according to claim 9 or 10 wherein said structure includes a vertically moveable platform providing a floor for said mould adjacent the foot of a tower for enclosing an upright column of curd, the machine further comprising a transversely reciprocable guillotine for severing successive blocks of cheese from the column.

18. A cheese block forming machine according to claim 17 wherein said structure further includes a moveable panel and associated drive means for ejecting the block through said opening.

* * * * *